US011281837B2

(12) United States Patent
Nalluri et al.

(10) Patent No.: US 11,281,837 B2
(45) Date of Patent: Mar. 22, 2022

(54) ROUTER-BASED TRANSACTION ROUTING FOR TOGGLE REDUCTION

(71) Applicant: Intel Corporation, Santa Clara, CA (US)

(72) Inventors: Hema Chand Nalluri, Hyderabad (IN); Balaji Vembu, Folsom, CA (US); Santosh Tripathy, Bangalore (IN); Altug Koker, El Dorado Hills, CA (US); Pattabhiraman K, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 15/845,788

(22) Filed: Dec. 18, 2017

(65) Prior Publication Data

US 2019/0034576 A1  Jan. 31, 2019

(51) Int. Cl.
| G06F 30/394 | (2020.01) |
| G06F 1/3234 | (2019.01) |
| G06F 13/40  | (2006.01) |
| G06F 30/30  | (2020.01) |
| G06F 30/398 | (2020.01) |

(52) U.S. Cl.
CPC ......... *G06F 30/394* (2020.01); *G06F 1/3253* (2013.01); *G06F 13/4027* (2013.01); *G06F 30/30* (2020.01); *G06F 30/398* (2020.01)

(58) Field of Classification Search
CPC ...... G06F 30/394; G06F 30/30; G06F 30/398; G06F 13/4027; G06F 1/3253; Y02D 10/00
See application file for complete search history.

(56) References Cited

U.S. PATENT DOCUMENTS

| 8,270,316 B1 * | 9/2012 | Chang ................. G06F 15/7825 370/254 |
| 9,582,449 B2 * | 2/2017 | Bennett ............... G06F 13/1684 |
| 9,971,716 B2 * | 5/2018 | Anyuru ................ G06F 13/362 |
| 2005/0281249 A1 * | 12/2005 | Chander ................ H04L 45/00 370/351 |
| 2010/0043067 A1 * | 2/2010 | Varadhan ............... H04L 45/16 726/13 |
| 2012/0163162 A1 * | 6/2012 | Zhang .................. H04L 49/552 370/218 |
| 2013/0304955 A1 * | 11/2013 | Shirlen ............... G06F 11/3656 710/110 |

(Continued)

OTHER PUBLICATIONS

Natalie Enright Jerger et al., "Virtual Circuit Tree Multicasting: A Case for On-Chip Hardware Multicast Support" Computer Architecture, 2008. ISCA '08 35th International Symposium on, Jun. 21-25, 2008.

*Primary Examiner* — Nha T Nguyen

(74) *Attorney, Agent, or Firm* — Schwabe, Williamson & Wyatt, P.C.

(57) ABSTRACT

In accordance with embodiments disclosed herein, there is provided systems and methods for router-based transaction routing for toggle reduction. An integrated circuit includes a transmitter circuit, receiver circuits, and a multicast bus coupled between the transmitter circuit and the receiver circuits. The multicast bus includes a first flow router circuit to route a multicast signal to a first receiver circuit of the plurality of receiver circuits and not route the multicast signal to a second receiver circuit of the plurality of receiver circuits.

9 Claims, 8 Drawing Sheets

(56) References Cited

U.S. PATENT DOCUMENTS

| | | | |
|---|---|---|---|
| 2014/0082238 A1* | 3/2014 | Ahmad | G06F 13/42 |
| | | | 710/110 |
| 2014/0241357 A1* | 8/2014 | Liu | H04L 45/745 |
| | | | 370/392 |
| 2014/0376366 A1* | 12/2014 | Li | H04L 45/124 |
| | | | 370/230 |
| 2016/0323116 A1* | 11/2016 | Garofalo | H04L 12/1868 |
| 2018/0191515 A1* | 7/2018 | Vivekanandan | H04L 12/1881 |
| 2019/0007225 A1* | 1/2019 | Nagarajan | H04L 12/185 |

* cited by examiner

ROUTER-BASED TRANSACTION ROUTING FOR TOGGLE REDUCTION

DESCRIPTION OF EMBODIMENTS

Figure 1:
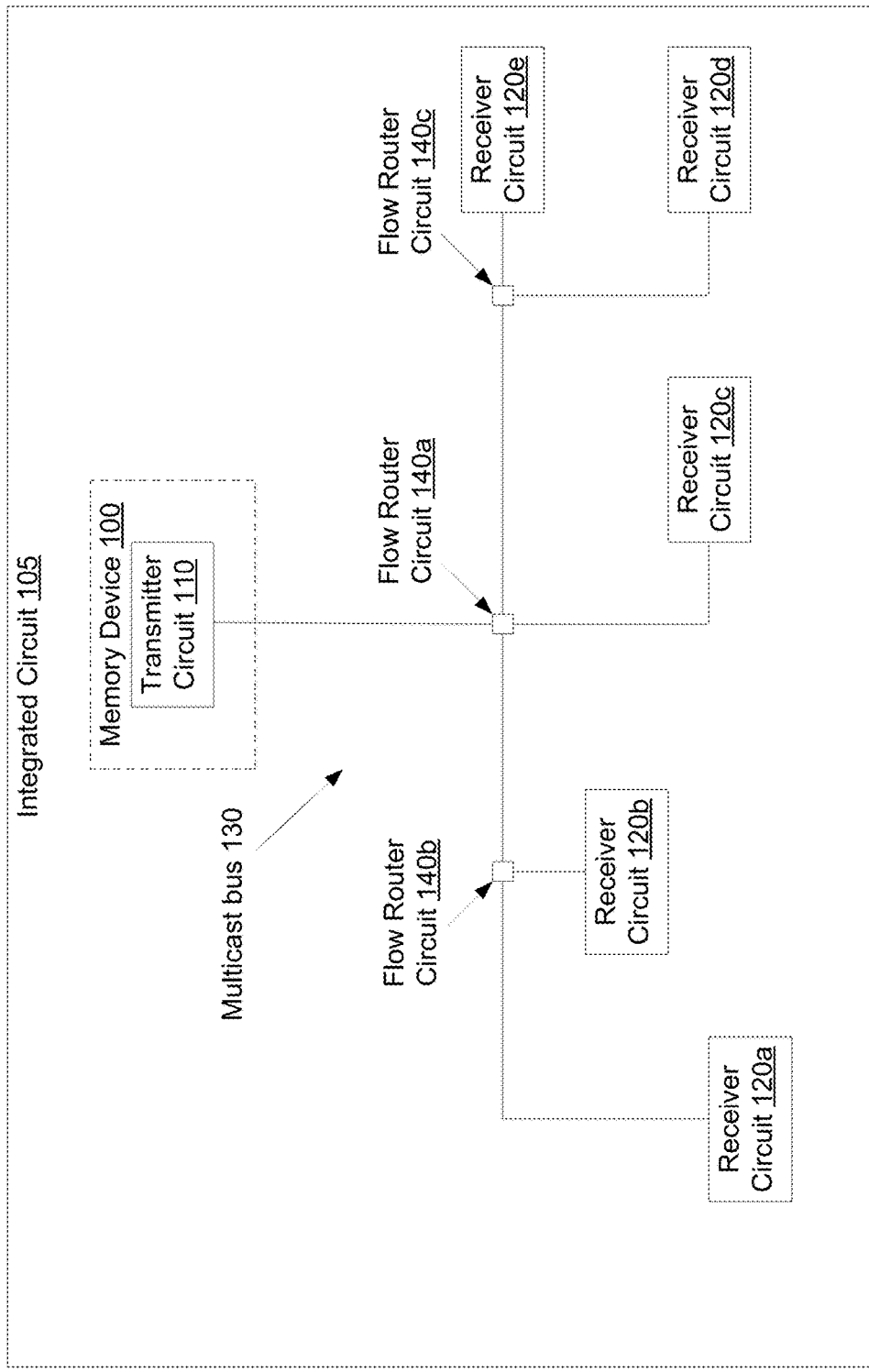
FIG. 1 illustrates an integrated circuit that includes flow router circuits, according to certain embodiments.

An integrated circuit may include one or more buses that couple multiple circuits (e.g., a transmitter circuit and receiver circuits). The circuits may include intellectual property (IP) blocks, such as graphics (GFX) IP blocks. A bus is a multicast bus when multiple circuits are tapping the same bus for communication. For example, a multicast bus across IPs may be used to read return data from a memory device. One or more multicast buses may be spread across multiple partitions and/or sections of an integrated circuit or within the same partition of an integrated circuit. The routing of a multicast bus may be varied based on the floor plan (e.g., how partitions are placed) and the circuits connected to the multicast bus.

A transmitter circuit may output a transaction on a multicast bus targeted to (e.g., is to be decoded by) a specific receiver circuit (or a subset of the receiver circuits). Each of the segments of the multicast bus may toggle so that each of the receiver circuits can decode the transaction to determine if the transaction corresponds to that receiver circuit. Each transaction on the multicast bus may result in toggling of bits from end to end of the multicast bus (e.g., toggling each of the segments between the transmitter circuit and each of the receiver circuits). The toggling results in toggle power consumed across the segments of the multicast bus. The toggling of bits consumes dynamic power.

An integrated circuit (e.g., an integrated circuit including GFX IP) may include multiple multicast buses with varying widths at various levels, within a unit, spanning units, spanning partitions, and/or chip-wide. Designing and managing a router-based network for a given bus is tedious and typically employed only for well-defined buses with primary intention to increase the effective bus bandwidth. A determination may be made whether there is enough return-on-investment (ROI) across products (stock keeping units (SKU)) and programs to invest time in designing a router-based network for a given bus. Conventional routers are difficult to maintain across SKUs with varying floor plans and are difficult to scale. A router-based network cannot be employed as a generic mechanism to any multicast bus due to the associated high design cost and efficiency issues.

The devices, systems, and methods, as disclosed herein, provide router-based transaction routing for toggle reduction (e.g., via flow router circuits). Methods are automated for flow router circuit insertion at optimal points for power gains. The router-based system for routing segments of multicast buses, as disclosed herein, is adaptable at all levels of the integrated circuit with high efficiency, minimal design change, and minimal maintenance overhead. This reduces toggle power consumed by the multicast buses and reduces dynamic power consumption.

A flow router circuit may route a multicast signal to a first receiver circuit and not route the multicast signal to other receiver circuits. Not routing the multicast signal to multiple receiver circuits reduces toggle power consumed. Insertion of flow router circuits on the multicast bus (e.g., based on bus topology floor plan, placement, and routing information without burdening the front end design (RTL)) may limit the transaction flow (e.g., toggles) to only relevant sections of the multicast bus based on the receiver circuit (e.g., destination unit). Placement of the flow router circuit may be decided based on power saved on a segment of the multicast bus by avoiding toggles compared to the power consumed by the flow router circuit. Since multicast buses are widely used in integrated circuits (e.g., in GFX IPs), reducing toggles on these buses will significantly reduce dynamic power consumed. The power savings can be leveraged to increase performance or battery life time which may be crucial across all bus segments (e.g., GFX segments) for ultra-low power, low power, and high-performance GFX segments. The placement of flow router circuits in the multicast bus optimizes toggles on multicast buses without burdening the front design process (RTL) development.

An IP block may be placed in different SKUs and each SKU may have its own specific floor plan requirements. The automated routing of multicast signals (in response to placement of flow router circuits) promotes adaption across SKUs. Since the flow is automated, automated routing of multicast signals can be applied to multicast buses without restrictions.

FIG. 1 illustrates an integrated circuit 105 that includes flow router circuits 140, according to certain embodiments. In some embodiments, the transmitter circuit 110 and the receiver circuits 120 being on the same integrated circuit 105. In some embodiments, the transmitter circuit 110 resides in a device (e.g., a memory device 100, a different type of device, etc.) and the receiver circuits 120 are different functional units (e.g., hardware in a processor) coupled to the memory device 100. In some embodiments, the transmitter circuit 110 is on a first chip and one or more of the receiver circuits 120 may be on a second chip. In some embodiments, the transmitter circuit 110 and the receiver circuits 120 are within the same block (e.g., memory device 100, a functional unit, hardware in the processor).

The receiver circuits may include more or less than receiver circuits 120a-e, as illustrated in FIG. 1. A multicast bus 130 may have "N" segments (e.g., segments 230), "P" split points (e.g., split points 200), and "Q" flow router circuits 140. A multicast bus 130 may couple the transmitter circuit 110 with each of the receiver circuits 120. The multicast bus 130 may include one or more segments and one or more split points 200 (see FIGS. 2A-C) or junctions (e.g., see partition pins in FIG. 4B-D). The transmitter circuit 110 is connected to the receiver circuits 120a-e through several segments 230 (see FIGS. 2A-C) of the multicast bus 130. Flow router circuits 140 may be inserted on to the segments 230 of the multicast bus 130 at one or more of the split points 200 or junctions (see FIGS. 2A-C).

A receiver circuit 120 may transmit a request to the transmitter circuit 110 via the multicast bus 130. The transmitter circuit 110 may transmit (e.g., output) a transaction (e.g., a response to the request) via the multicast bus 130 that is targeted to a specific receiver circuit 120 (e.g., the receiver circuit 120 that transmitted the request). The flow router circuits 140 may allow the transaction to be relayed only on the segments 230 of the multicast bus 130 that are required (e.g., the route from the transmitter circuit 110 to the corresponding receiver circuit 120) for the transaction to make forward progress and reach the receiver circuit 120 (the destination unit). The use of the flow router circuits 140 may limit the transaction (e.g., toggling) to only relevant sections of the multicast bus 130 that require the transaction to reach the targeted receiver circuit 120 (e.g., destination unit) and may avoid toggling the whole multicast bus 130. For example, when the transmitter circuit 110 outputs a transaction targeted to receiver circuit 120d, only first segment 230a, third segment 230c between flow router circuit 140a and flow router circuit 140c, and sixth segment 230f are toggled as they are the only segments that are required for the transaction to reach from transmitter circuit 110 to receiver circuit 120d.

The flow router circuit 140 may decode incoming transactions (e.g., from the transmitter circuit 110) to determine the receiver circuit 120 (e.g., end destination unit/units) which requires the transaction. The flow router circuit 140 may determine, based on the determined receiver circuit 120, the output ports (e.g., segments 230) on which the transactions are to be relayed. The flow router circuit 140 may keep the output ports (segments 230) grounded to which there is no transaction to be relayed, thus avoiding toggles.

Figure 2A:
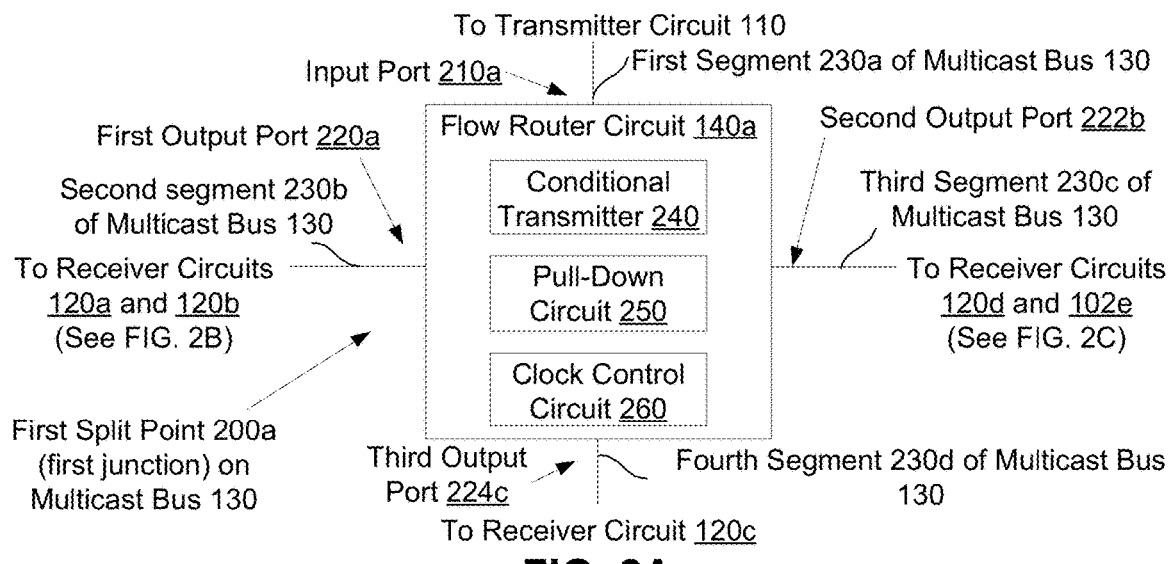
FIGS. 2A-C illustrate flow router circuits, according to certain embodiments.
Figure 2B:
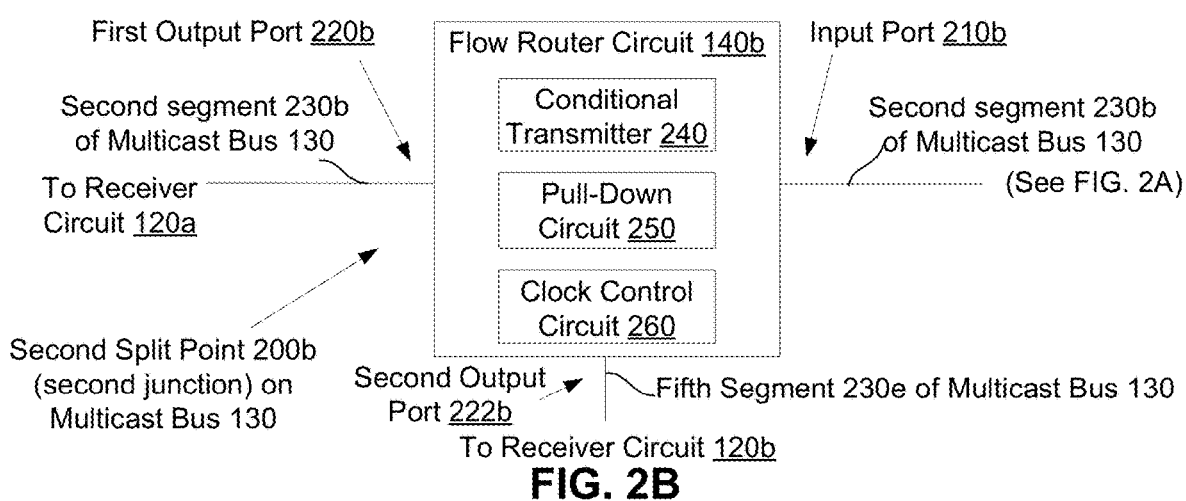
Figure 2C:
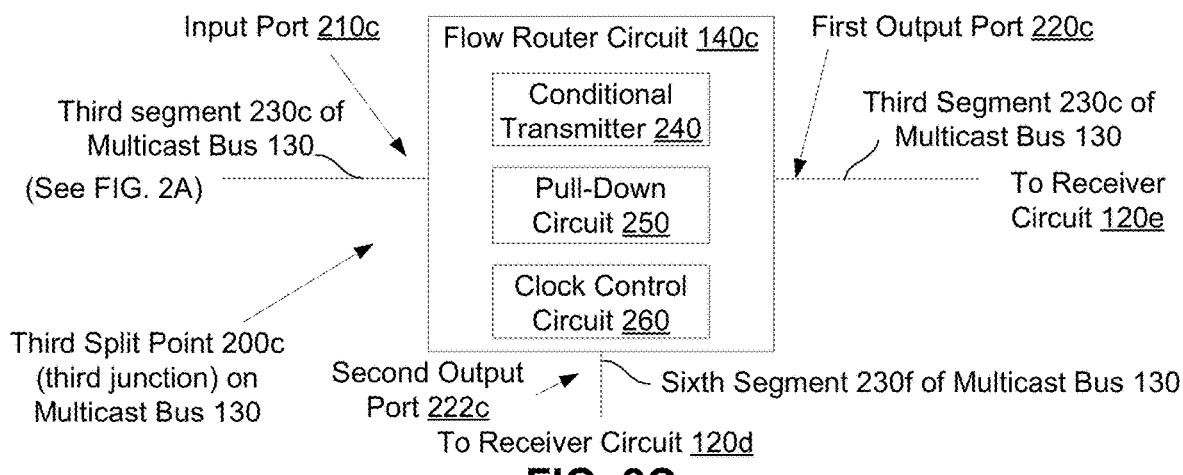

FIGS. 2A-C illustrate flow router circuits 140, according to certain embodiments. Each flow router circuit 140 may include an input port 210, a first output port 220, and a second output port 222. Each flow router circuit 140 may include a conditional transmitter 240, a pull-down circuit 250, and a clock controlled circuit 260. The conditional transmitter 240 may receive a multicast signal (e.g., corresponding to a transaction output by the transmitter circuit 110) on the input port 210 and decode the multicast signal. In some embodiments, in response to decoding the multicast signal, the conditional transmitter 240 may determine to transmit the multicast signal on the first output port 220, the second output port 222, or both. In some embodiments, in response to decoding the multicast signal, the conditional transmitter 240 may determine to ground the first output port 220, the second output port 222, or both using the pull-down circuit 250.

The clock control circuit 260 may be coupled to the conditional transmitter 240. The clock control circuit 260 may control timing of transmission of the multicast signal, if at all, on the first output port 220, the second output port 222, or both. In some embodiments, the flow router circuit acts as a repeater and avoids toggling by controlling (e.g., enabling and disabling) the clock gating (e.g., via the clock control circuit 260) on the ports (e.g., the ports that are to transmit the multicast signal).

FIG. 2A illustrates flow router circuit 140a, according to certain embodiments. The multicast bus 130 may include a first split point 200a. The first split point 200a may be a first junction coupled to a first segment 230a of the multicast bus 130, a second segment 230b of the multicast bus 130, a third segment 230c of the multicast bus 130, and a fourth segment 230d of the multicast bus. The fourth segment 230d may be coupled to receiver circuit 120c. In some embodiments, the multicast bus 130 includes a flow router circuit 140a at the first split point 200a. The flow router circuit 140a may route a multicast signal to a single receiver circuit 120 of the receiver circuits 120a-e.

The flow router circuit 140a may include an input port 210a, a first output port 220a, a second output port 222a, and a third output port 224a. The input port 210a of the flow router circuit 140a may be coupled to a first segment 230a of the multicast bus 130 (e.g., that is coupled to the transmitter circuit 110). The first output port 220a may be coupled to a second segment 230b of the multicast bus 130. The second output port 222a may be coupled to a third segment 230c of the multicast bus 130. The third output port 224a may be coupled to a fourth segment 230d of the multicast bus 130 (e.g., that is coupled to receiver circuit 120c).

FIG. 2B illustrates a flow router circuit 140b, according to certain embodiments. The multicast bus 130 may include a second split point 200b on the second segment 230b of multicast bus 130. The second split point 200b may be a second junction coupled to an inlet portion of the second segment 230b, an outlet portion of the second segment 230b, and a fifth segment 230e of multicast bus 130. In some embodiments, the multicast bus 130 includes a flow router circuit 140b at the second split point 200b. The flow router circuit 140b may route a multicast signal to a single receiver circuit 120 of the receiver circuits 120a-b.

The flow router circuit 140b may include an input port 210b, a first output port 220b, and a second output port 222b. The input port 210b of the flow router circuit 140b may be coupled to the second segment 230b of the multicast bus 130 (e.g., that is coupled to the flow router circuit 140a). In some embodiments, the first output port 220b may be coupled to the second segment 230b of the multicast bus 130 (e.g., that is coupled to receiver circuit 120a). In some embodiments, the first output port 220b is coupled to a seventh segment of the multicast bus 130 (e.g., that is coupled to a receiver circuit 120a). The second output port 222b may be coupled to a fifth segment 230e of the multicast bus 130 (e.g., that is coupled to receiver circuit 120b).

FIG. 2C illustrates a flow router circuit 140c, according to certain embodiments. The multicast bus 130 may include a third split point 200c on the third segment 230c of the multicast bus 130. The third split point 200c may be a third junction coupled to an inlet portion of the third segment 230c, an outlet portion of the third segment 230c, and a sixth segment 230f of multicast bus 130. In some embodiments, the multicast bus 130 includes a flow router circuit 140c at the third split point 200c. The flow router circuit 140c may route a multicast signal to a single receiver circuit 120 of the receiver circuits 120d-e.

The flow router circuit 140c may include an input port 210c, a first output port 220c, and a second output port 222c. The input port 210c of the flow router circuit 140b may be coupled to the third segment 230c of the multicast bus 130 (e.g., that is coupled to the flow router circuit 140a). In some embodiments, the first output port 220c may be coupled to the third segment 230c of the multicast bus 130 (e.g., that is coupled to receiver circuit 120e). In some embodiments, the first output port 220c may be coupled to an eighth segment of the multicast bus 130 (e.g., that is coupled to receiver circuit 120e). The second output port 222c may be coupled to a sixth segment 230f of the multicast bus 130 (e.g., that is coupled to receiver circuit 120d).

Figure 3:
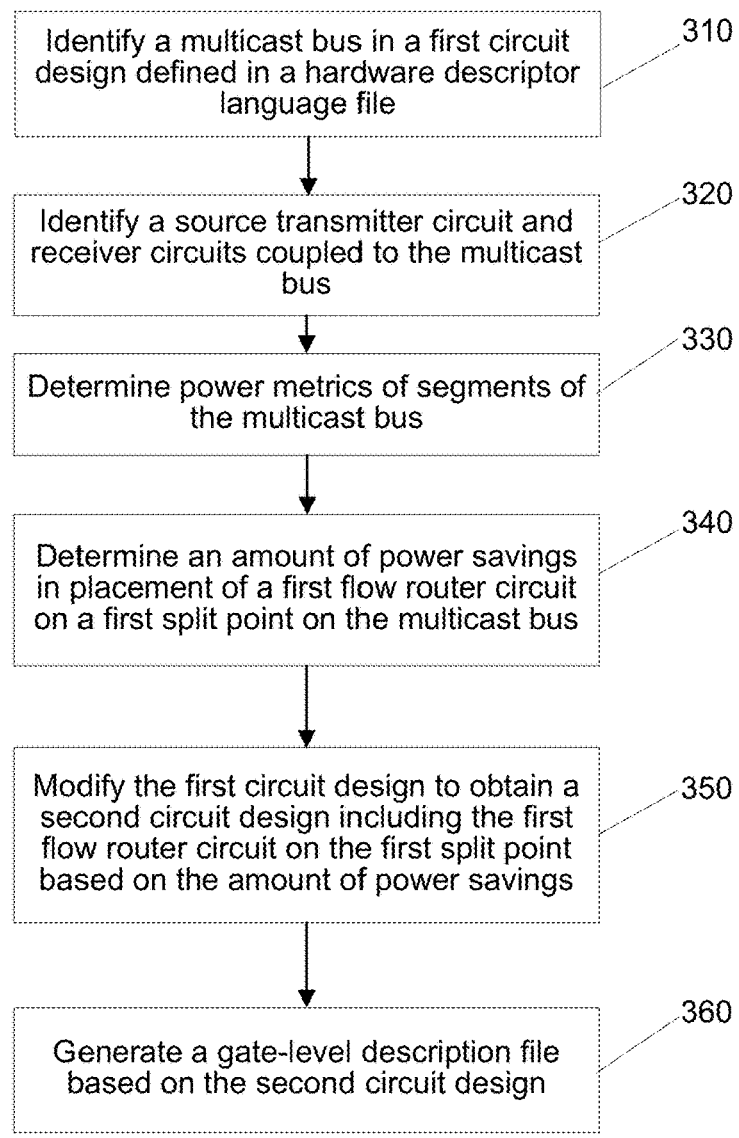
FIG. 3 is a flow diagram of a method of including a flow router circuit in a circuit design, according to one embodiment.

FIG. 3 is a flow diagram of a method 300 of including a flow router circuit 140 in a circuit design, according to one embodiment. Method 300 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 300 may be performed, in part, by a layout and routing tool executing on a processing device. In some embodiments, a non-transitory storage medium stores instructions that when executed by a processing device cause the processing device to perform method 300.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events. In some embodiments, method 300 may be incorporated in to main stream flows and deployed across IP blocks via electronic design animation (EDA) (e.g., via EDA tools).

Referring to FIG. 3, at block 310, the processing logic identifies a multicast bus 130 in a first circuit design defined in a hardware descriptor language file.

The multicast bus 130 may be identified during register-transfer level (RTL) design (front end design (FED)) and may be coded using corresponding structures. Side information may be embedded in the corresponding structures. The side information may include information regarding receiver circuits 120 connected to the multicast bus 130 and client decode information may.

At block 320, the processing logic identifies a source transmitter circuit 110 and receiver circuits 120 coupled to the multicast bus 130.

Topology of the multicast bus 130 may be extracted (e.g., via the side information embedded in corresponding structures of the multicast bus 130). The topology may include floor plan, transmitter circuit 110 and receiver circuit 120 placement, and routing for the multicast bus 130. Based on the topology of the multicast bus 130, appropriate router insertion points (e.g., partition points) are identified and router tables are populated.

At block 330, the processing logic determines power metrics of segments 230 of the multicast bus 130. In some embodiments, determining the power metrics includes determining the toggle power consumed by the segments 230. The toggle power consumed by the segments 230 may be based on one or more of corresponding bus route length, corresponding bus width, corresponding process specific resistor-capacitor (RC) values (e.g., at the blocks of the node, and corresponding activity factor (e.g., 50%). In some embodiments, the RC value is the time constant value of the circuit. In some embodiments, the RC value may be the time required to charge a capacitor through a resistor from an initial charge voltage of zero to a first threshold value (e.g., ~63.2% of the value of an applied DC voltage). In some embodiments, the RC value is time required to discharge the capacitor through the resistor to a second threshold value (e.g., ~36.8% of the initial charge voltage).

At block 340, the processing logic determines an amount of power savings in placement of a first flow router circuit 140a on a first split point 200a on the multicast bus 130. The processing logic may determine, for each of a plurality of split points ("P" split points 200 corresponding to respective segments of "N" segments) of the multicast bus 130, a corresponding amount of power savings in placement of a corresponding flow router circuit (of "Q" flow router circuits 140) on a corresponding split point of the plurality of split points. For example, each of the split points 200 may be tested for router insertion prior to generation of the second circuit design. Determining the amount of power savings may include determining the effective power saved due to toggle reduction (e.g., the toggle power consumed) on all out bound segments compared to the power consumed by the flow router circuit 140a.

At block 350, the processing logic modifies the first circuit design to obtain a second circuit design including the first flow router circuit 140a on the first split point 200a (e.g., selecting a router insertion point) based on the amount of power savings. The processing logic may modify the first circuit design to obtain a plurality of flow router circuits ("Q" flow router circuits 140), each of the plurality of flow router circuits being on the corresponding split point (of "P" split points 200 corresponding to respective segments of "N" segments) when the corresponding amount of power savings is greater than a corresponding amount of power to be consumed by the corresponding flow router circuit. In some embodiments, the processing logic modifies the first circuit design to obtain the second circuit design when amount of power savings (e.g., effective power saved due to toggle reduction on al outbound segments) is greater (e.g., at least two times greater) than an amount of power to be consumed by the first flow router circuit 140a.

Modifying of the first circuit design to obtain a second circuit design including the first flow router circuit 140a may include determining a split point (e.g., junction, router insertion point) and populating a flow router circuit table. In some embodiments, determining the router insertion point is by walking back from the furthest receiver circuit 120 (e.g., destination unit) to reach a split point 200 (e.g., a junction where there is one inlet segment and more than one outlet segment) and determining if the segment length is enough to justify the router insertion. Upon reaching the split point 200, the one or more other outlet segments may be forward traversed to find any other receiver circuits 120 or split points 200. While the walk is being done, flow router circuit justification is evaluated.

For each split point 200, a router table may be created and the router table may be populated with clients (receiver circuits 120) connected to respective output ports of the corresponding split point 200 as the paths are traversed. Once all of the outlet segments of the split point 200 are traversed, the reverse traverse on the input segment of the split point 200 is continued. Once the transmitter circuit 110 is reached, a check is made for the left over receiver circuits 120 that are not covered. The furthest receiver circuit 120 is then identified and the process is repeated. This process is repeated until all of the receiver circuits 120 have been identified. In some embodiments, another method (e.g., algorithm) is used to perform the span walk of the segments.

Router insertion points may be determined based on comparing the bus width (e.g., fixed bus width of the multicast bus 130), route length (e.g., from the receiver circuit 120 back to the transmitter circuit 110), and specific RC values to the gates consumed by the pull-down logic (e.g., pull down circuit 250 of flow router circuit 140) and the router logic to ensure there is enough ROI for router insertion and pull-down logic.

While the flow router circuits 140 are inserted as part of the back end flows through automation, the information regarding the inserted flow router circuits 140 may be back annotated into various front end simulation flows to check for functional issues.

At block 360, the processing logic generates a gate-level description file based on the second circuit design.

In some embodiments, method 300 may analyze multicast buses that exist in design and that are not explicitly defined by front end description for auto-router insertion (e.g., automatic insertion of flow router circuits). The method 300 may further suggest potential multicast buses that are candidates for auto-router insertion based on bus width, bus length, and split points 200 (e.g., the amount of power savings by inserting one or more flow router circuits is greater than an amount of power to be consumed by the one or more flow router circuits).

Figure 4A:
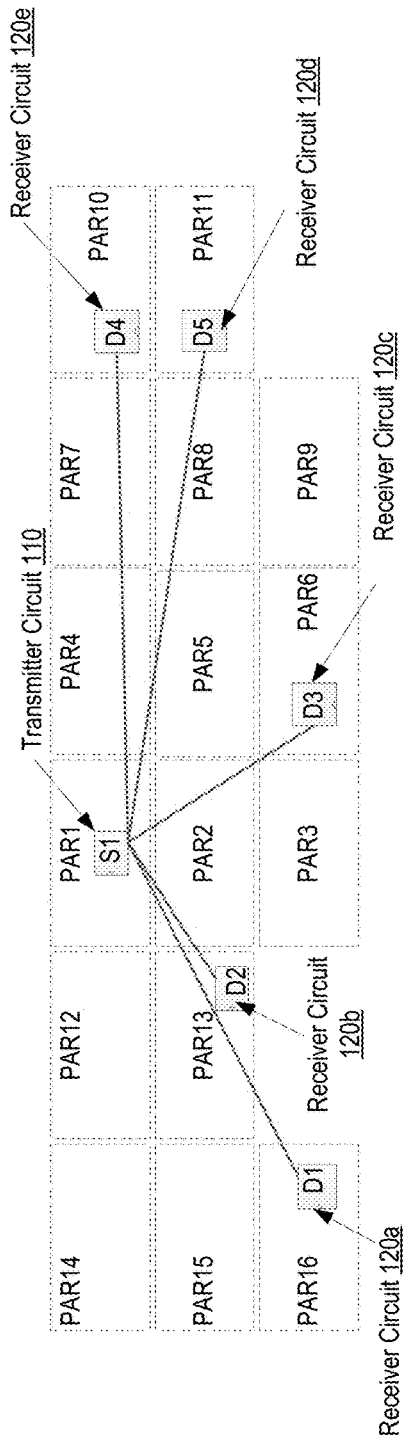
FIGS. 4A-D illustrate integrated circuits for placement of flow router circuits, according to certain embodiments
Figure 4B:
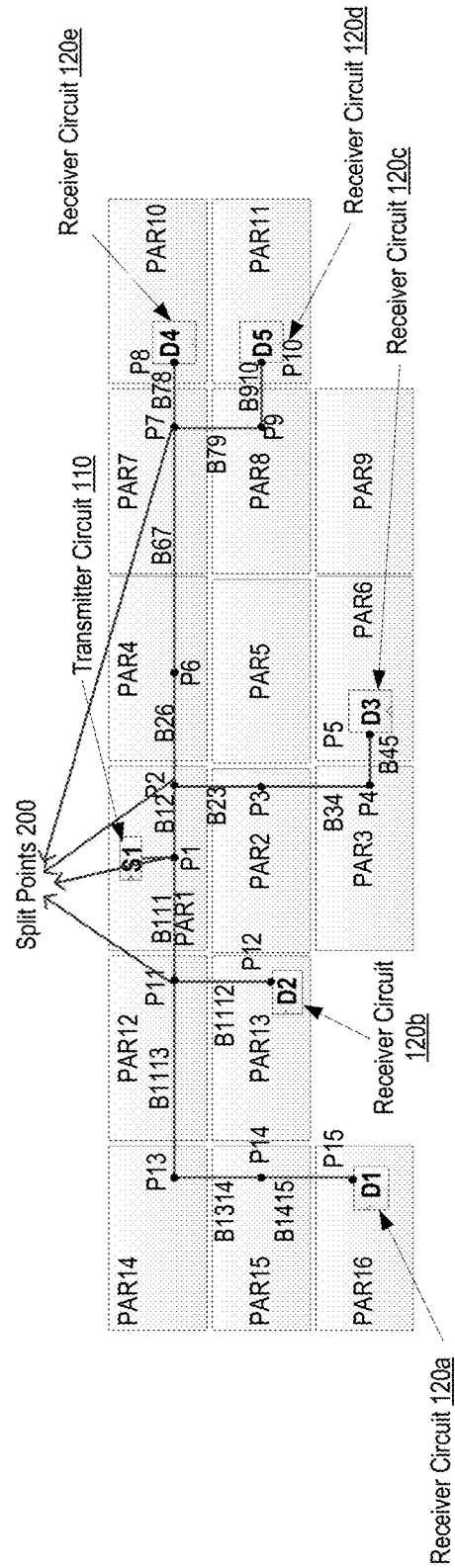
Figure 4C:
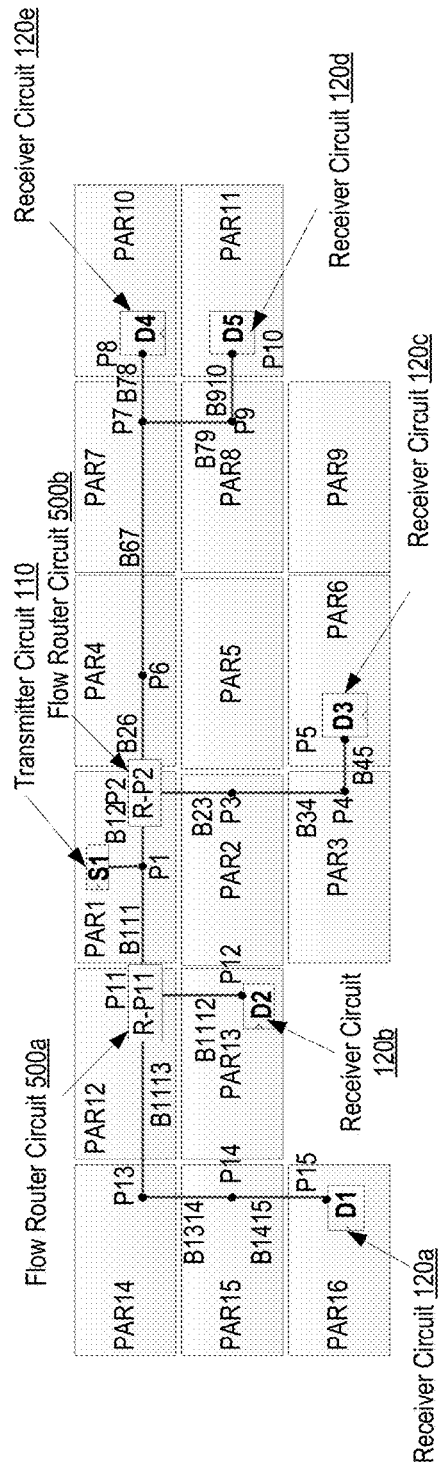

FIGS. 4A-D illustrate integrated circuits for placement of flow router circuits 500, according to certain embodiments. The phases of design may include front end flow and back end flow. The front end flow may be illustrated in FIG. 1. The backend flow may include a synthesis phase (FIG. 4A), a design planning phase (FIG. 4B), a placement and routing phase (FIG. 4C).

Front end flow (see FIG. 1) may include defining the architecture solution specification (e.g., micro architecture flow). The front end flow may include transforming the specifications into register transfer logic (RTL) design (e.g., using System Verilog, Verilog, very high speed integrated circuit (VHSIC) hardware description language (VHDL), etc.). RTL logic may be used for design simulation. Once validated, RTL logic may be provided to the back end flow (e.g., FIGS. 4A-C) to transform the RTL into actual design layout that would be given to fabrication for developing the silicon ship. RTL may be a logical code and may include various hierarchies such as functional unit blocks (FUBs), units, and clusters.

For example, during the specification or during RTL design, a user may identify (e.g., via the layout and routing tool) an interconnect (e.g., BUS-B, multicast bus 130) which is multicast and may be used for toggle reduction. A user may identify, via the layout and routing tool, a candidate on which a flow router circuit 500 may be placed (e.g., a router insertion scheme can be employed) to reduce toggle power. At the synthesis phase (see FIG. 4A), the layout and routing tool may define the transmitter circuit 110 and the receiver circuits 120 and may decode the bus at each of the receiver circuits 120. The transmitter circuit 110 (e.g., source logic) and the receiver circuits 120 (e.g., destination logic) may be between FUBS, between units, or between clusters.

A bus may be described for router insertion flows as follows:

```
BUS-B {
    BUS NAME: data_bus
    BUS WIDTH: 256b
    Source Unit: S1
    Destination Units: D1, D2, D3, D4, D5
    Control Signal: dvr
    Control Decode Signal: tag[2:0]
    Destination Decode Logic:
        D1: tag==0;
        D2: tag==1;
        D3: tag==2;
        D4: tag==3;
        D5: tag==4;
} END BUS-B
```

The BUS-B may be the multicast bus 130, the source unit (S1) may be the transmitter circuit 110, the destination units (D1-5) may be the receiver circuits 120a-e. In some embodiments, the BUS-B definition "tag" decoding for each of the receiver circuits 120 is unique. Is some embodiments, the BUS-B definition "tag" decoding for each of the receiver circuits 120 is not unique (e.g., two receiver circuits 120 can have the same tag decoding).

FIGS. 4A-C may illustrate back end flow (e.g., structural design (SD) flow). SD flows include inputting an RTL code and walking through sub flows to output an actual design layout which is used by fabrication (e.g., factories) to produce a silicon chip from the design layout. The SD flow may include synthesis (see FIG. 4A), design planning (see FIG. 4B), and placement and route (see FIG. 4C).

FIG. 4A illustrates the synthesis phase of the SD flow, according to certain embodiments. A layout and routing tool (e.g., EDA tool) executing on a processing device may perform the synthesis phase. During the synthesis phase, RTL code is used as an input and is synthesized (translated) into logical circuits (gates). The logic circuits may include one or more of FLOP, NAND, NOR, AND, NOT, etc. gates. The output of the synthesis phase may be a sea-of-gates logic connected in a functional way (e.g., a gate-level netlist). The gate-level netlist may be a description of connectivity of an electronic circuit including a list of the electronic components (e.g., receiver circuits 120, transmitter circuit 110) in a circuit and a list of the nodes to which the electronic components are connected.

In some embodiments, during the synthesis phase, the design (e.g., the entire design) is synthesized into a gate-level netlist with logical connection (e.g., without information on physical placement or the routing details). FIG. 4A displays how the BUS-B is logically connected in gate-level netlist.

FIG. 4B illustrates the design planning phase of the SD flow, according to certain embodiments. A layout and routing tool (e.g., EDA tool) executing on a processing device may perform the designing planning phase. The design planning phase may receive the gate level netlist outputted by the synthesis phase and may allow the netlist to be broken down into groups of units or cluster level (e.g., partitions).

The partitions may be placed to make a floor plan. The placement of the partitions may be based on several factors, such as number of interfaces between partitions, timing critical interfaces, and closed knitted functionalities. The design planning phase may apply physical bus topology information to the gate-level netlist. FIG. 4B illustrates how the BUS-B physical topology flows across the partitions. The design planning phase may output the floor plan (how partitions are placed) and the netlist with physical routing information between partitions (e.g., a physical bus topology of the interconnect between the partitions). The output from the design planning phase provides information on how the bus is flowing through the partitions, the split points, and the corresponding length between each segment.

The layout and routing tool may determine the multicast bus 130 is being routed through partition pins P1, P2 . . . P15. For each partition pin, the layout and routing tool may provide a fanout. A partition pin with more than one fanout may be a split point 200. For partition pin P11, the layout and routing tool may determine that there are two fanouts, one fan out to P12 and another fan out to P13. The layout and routing tool may determine that, for P6, there is only one fan out to P7. The layout and routing tool may provide (e.g., in addition to the partition pin and fanout information) the wire length between the pins. For example, for P11 fanout to pins P12 and P13, the layout and routing tool may indicate the route segment lengths (bus length B1112 and B1113 connecting between P11 to P12 and P13 respectfully. The physical topology information may only be available until the partition boundary that has a receiver circuit 120 (e.g., destination unit).

The design planning phase may include router insertion flow. The information available at the design planning phase (e.g., partition pins, fanout, and bus length) may be used for multicast buses 130 that interconnect units (e.g., transmitter circuit 110, receiver circuits 120) across the partitions to assess for router insertion. The information (e.g., partition pins, fanout, and bus length) may be processed to determine whether a flow router circuit 500 is to be inserted to provide toggle reduction.

In some embodiments, based on the manufacturing process information, it may be determined that insertion of a flow router circuit 500 gives enough ROI when the single wire length is more than 1000 microns. The bus width may be 256 bits, thus any route segment length or cumulative route segment lengths greater than 1000/256 may be a candidate for router insertion.

A router may be justified if RL_TH<(RLA_C/BUS_WIDTH).

RL_TH is the minimum threshold route length for router insertion (e.g., 1000 microns). RL_AC is actual computed route length on the physical bus topology (e.g., multicast bus 130).

The layout and routing tool may traverse starting from the transmitter circuit 110 and through all of the split points 200. For each split point 200, the layout and routing tool may calculate the actual route length (RL_TH) to the final end destination (e.g., the corresponding receiver circuit 120) and check if a router insertion is justified (e.g., based on the equation RL_TH<(RL_AC/BUS_WIDTH)).

When the router insertion criteria is met, a flow router circuit 500 is inserted and the corresponding information is logged in a file (e.g., a hardware descriptor language file, a gate-level description file) for back annotation into the design.

In some embodiments, the router insertion criteria may be tested at split points P1, P2, P7, and P11 of (see FIG. 4B). In one example, only split points P2 and P11 meet the router insertion criteria, thus P2 and P11 are logged in the router insertion file for back annotation. The router insertion file may contain the following information.

---

```
ROUTER_P2{
    Partition Pin: P2
    Destination Units P2-P3: D3
    Destination Units P2-P6: D4, D5
    Worst Route Segment: D5
    Worst Route Segment Length: XXXX microns
} END ROUTER_P2
ROUTER_P11{
    Partition Pin: P11
    Destination Units P11-P12: D2
    Destination Units P11-P13: D1
    Worst Route Segment: D1
    Worst Route Segment Length: YYYY microns
} END ROUTER_P11
```

---

Figure 5A:
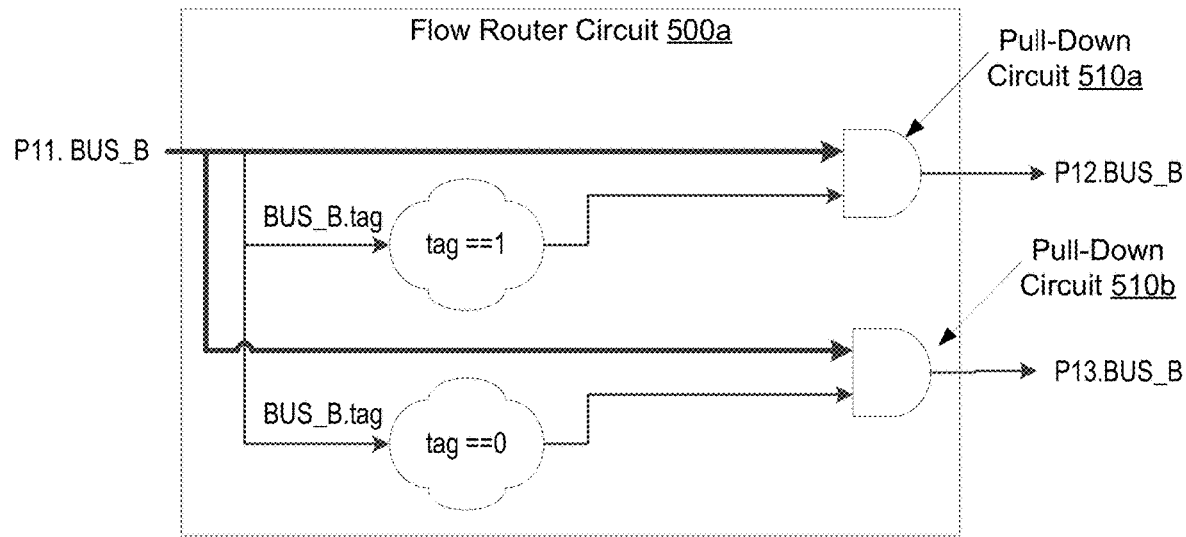
FIGS. 5A-B illustrate flow router circuits, according to certain embodiments.
Figure 5B:
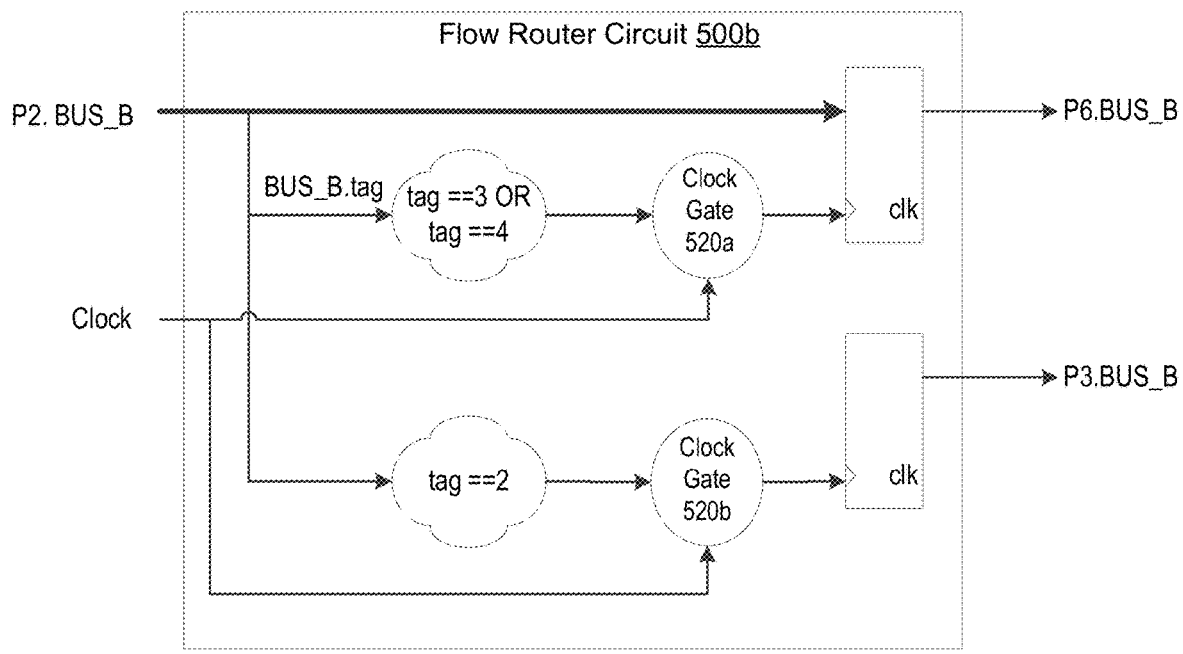

The router insertion file may be back annotated into the front end design to automatically insert the flow router circuits 500 (see FIGS. 5A-B). In some embodiments, router details from the router insertion file and the bus details are used to select and configure the flow router circuits 500 (e.g., as described in relation to FIGS. 5A-B).

FIG. 4C illustrates the placement and routing phase of the SD flow, according to certain embodiments. A layout and routing tool (e.g., EDA tool) executing on a processing device may perform the placement and routing phase. The placement and routing phase may take the netlist with physical routing, partition information and provide placement and routing of gates within a partition. The interconnects at partition level may be stitched to exact logic in the partition. The placement and routing phase may output the complete information on the physical bus topology from source until the end destination unit.

After back annotation, the flow router circuits 500 may be implemented in the front end. In some implementations, when the layout and routing tool re-runs the flow at the design planning phase, the router insertion may look like FIG. 4C.

The placement and routing phase of the flow takes the netlist with physical routing and partition information and performs placement and routing of gates and placement within a partition. As part of the placement and routing phase, the interconnects at partition level are stitched to corresponding logic in the partition. Multicast buses which are limited to being within a single partition may be visible (e.g., which were not visible during design planning flows as limited to partition level interconnects, see FIG. 4D).

The layout and routing tool may run router insertion checks and router back annotation flows within a partition similar to what was done at partition level flow during the design planning phase.

Figure 4D:
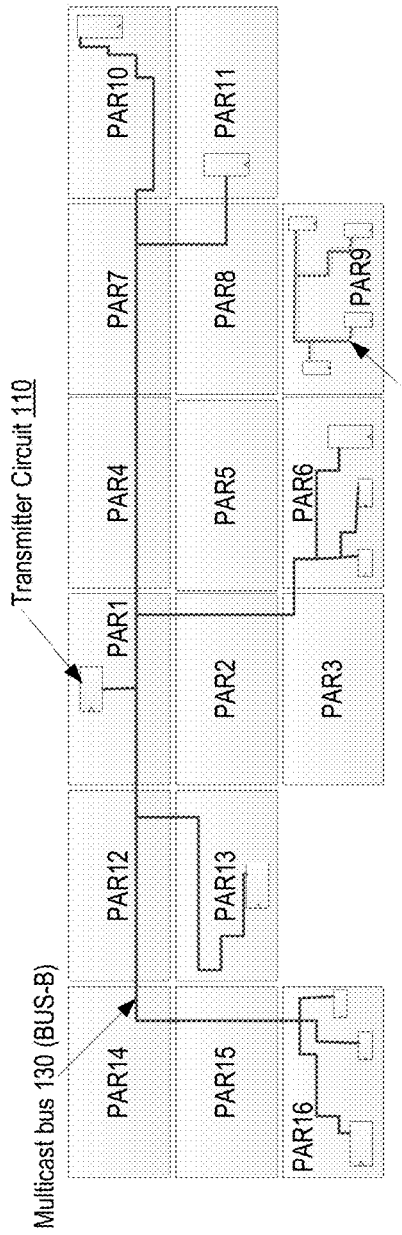

FIG. 4D illustrates a first multicast bus 130 and a second multicast bus 430, according to certain embodiments. As shown in FIG. 4D, PAR9 may display a new BUS-C topology (e.g., multicast bus 430) which is limited to PAR9. Router insertion flows may be analyzed on the BUS-C topology and the router insertion file may be updated with new router insertion details.

In some implementations, multiple receiver circuits 120 are in a given partition. For example, PAR16 may have three destinations (e.g., receiver circuits 120a1, 120a2, and 120a3) and PAR6 may have three destinations (e.g., receiver circuits 120c1, 120c2, and 120c3). The physical route details from partition port to the different destinations in a given partition may only be visible during this phase. Router insertion may be analyzed on the BUS-B physical topology within the partitions PAR16 and PAR 3 and the router insertion file may be updated with the new router insertion details.

FIGS. 5A-B illustrate flow router circuits 500, according to certain embodiments. In some embodiments, one or more of the flow router circuits 140 are a flow router circuit 500a. In some embodiments, one or more of the flow router circuits 140 are a flow router circuit 500b. During the design planning phase, a router insertion file may be back annotated into the front end design to automatically insert the flow router circuits 500. Router details from the router insertion file and bus details for the multicast bus 130 may be used to select and configure the flow router circuits 500. The type of flow router circuit 500 may be determined based on the worst route segment length.

The flow router circuit 500 may be configured to route an incoming transaction to one or more of the output ports. This configuration may be inferred from the router insertion file and bus description from the front end flows.

FIG. 5A illustrates a flow router circuit 500a, according to certain embodiments. A first type of flow router circuit 500a may include a pull-down circuit 510. Flow router circuit 500a may be selected if the worst route segment length is less than a threshold router length. The flow router circuit 500a may include router details of a first destination of receiver circuit 120b (D2) via router segments P11-P12 and a second destination of receiver circuit 120a (D1) via router segments P11-P13. The router details for flow router circuit 500a may include the following.

```
ROUTER_P11{
    Partition Pin: P11
    Destination Units P11-P12: D2
    Destination Units P11-P13: D1
    Worst Route Segment: D1
    Worst Route Segment Length: YYYY microns
} END ROUTER_P11
```

Based on the bus description for the multicast bus 130, for the P11-P12 routing to receiver circuit 120b (D2), the "tag" decoding is to be equal to 1 and for the P11-P13 routing to receiver circuit 120a (D1) the tag decode is to be equal to 0. If the tag is not equal to the corresponding value, the pull-down circuit 510 may ground the corresponding output port.

The bus description for the multicast bus 130 (BUS-B) may be as follows.

```
BUS-B {
    BUS NAME: data_bus
    BUS WIDTH: 256b
    Source Unit: S1
    Destination Units: D1, D2, D3, D4, D5
    Control Signal: dvr
    Control Decode Signal: tag[2:0]
    Destination Decode Logic:
        D1: tag==0;
        D2: tag==1;
        D3: tag==2;
        D4: tag==3;
        D5: tag==4;
} END BUS-B
```

FIG. 5B illustrates a flow router circuit 500b, according to certain embodiments. A second type of flow router circuit 500b may include a flop-based repeater circuit. Flow router circuit 500b may be selected if the worst route segment length is greater than the threshold route segment length. The flow router circuit 500b may include router details of a first destination of receiver circuit 120c (D3) via router segments P2-P3 and a second destination of receiver circuit 120d (D5) and 120e (D4) via router segments P2-P6. The router details for flow router circuit 500b may include the following.

```
ROUTER_P2{
    Partition Pin: P2
    Destination Units P2-P3: D3
    Destination Units P2-P6: D4, D5
    Worst Route Segment: D5
    Worst Route Segment Length: XXXX microns
} END ROUTER_P2
```

Based on the bus description, for the P2-P3 routing to receiver circuit 120c (D3), the "tag" decoding is to be equal to 2 and for the P2-P6 routing towards receiver circuit 120d (D5) and 120e (D4), the tag decode is to be either equal to either 4 or 5.

The clock gate 520 (e.g., clock control circuit 260) may control timing of transmission of the multicast signal, if at all, on the first output port 220, the second output port 222, or both. In some embodiments, the flow router circuit 500b acts as a repeater and avoids toggling by controlling (e.g., enabling and disabling) the clock gating (e.g., via the clock gate 520) on the ports (e.g., the ports that are to transmit the multicast signal).

Figure 6:
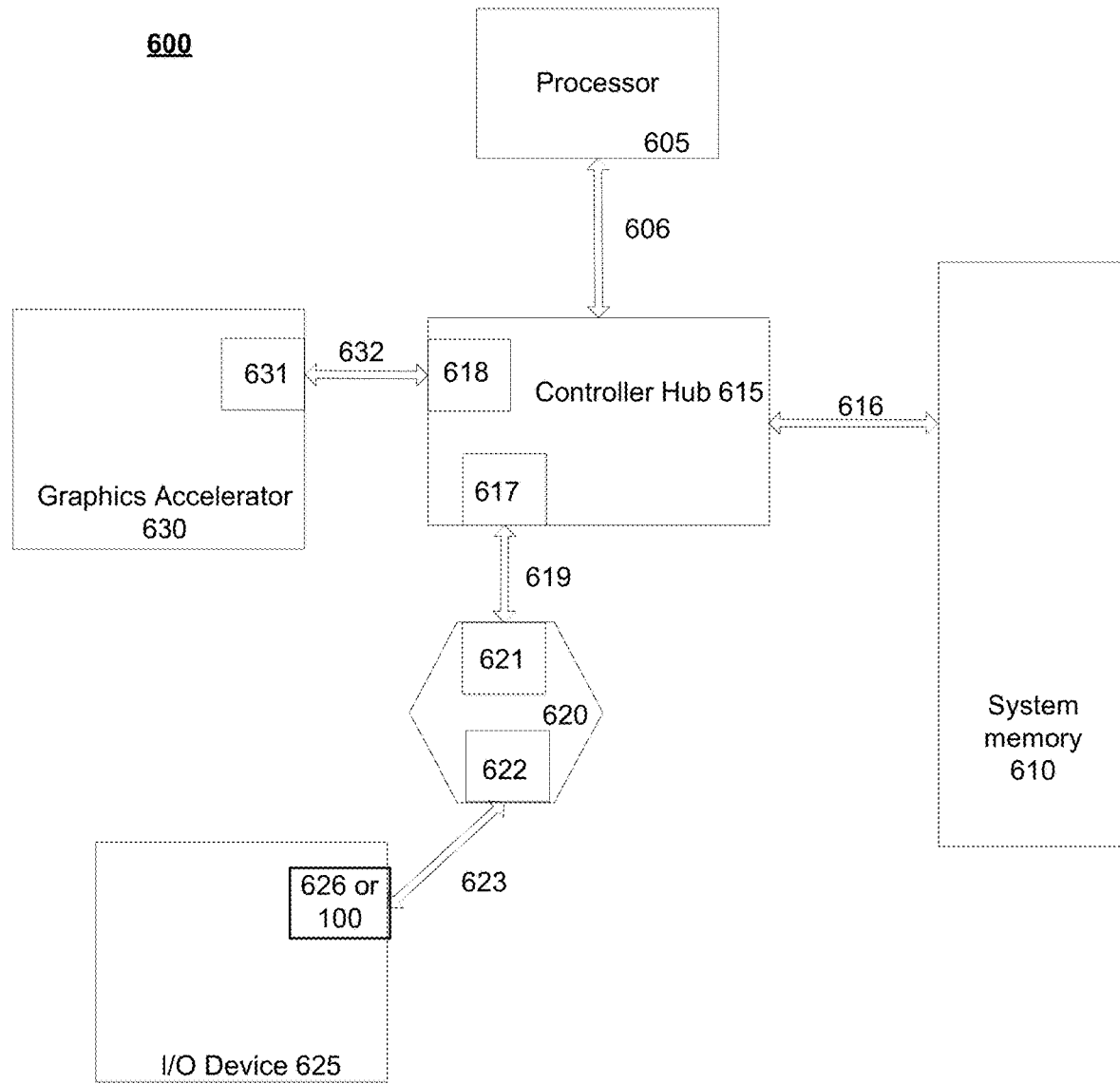
FIG. 6 illustrates a computer system with multiple interconnects, according to one embodiment.

FIG. 6 illustrates a computer system 600 with multiple interconnects, according to one embodiment. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, FSB 606 (e.g., link) includes a serial, differential interconnect architecture that is compliant with different interconnect standards.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In some embodiments, the memory interface 616 includes a multicast bus 130 that includes one or more flow router circuits 140 (see FIG. 1). In some embodiments, one or more of 606, 616, 619, 623, or 632 includes a multicast bus 130 that includes one or more flow router circuits 140 (see FIG. 1).

In one embodiment, controller hub 615 is a root hub, root complex, or root controller. Examples of controller hub 615 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex (e.g., controller 615).

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 625 may include a PCIe® to PCI/PCI-X bridge to support legacy or other version PCI devices.

Endpoint devices in PCIe® are often classified as legacy, PCIe®, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

I/O device 625 includes an interface 626 and switch/bridge 620 includes an interface 622. Interface 626 is coupled to interface 622 via serial link 623. Switch/bridge 620, interface 622, controller hub 615, interface 617, interface 621, on switch 620, and/or I/O device 625 may include flow router circuits 140.

In one embodiment, short range wireless engines including a WLAN unit and a Bluetooth® unit may couple to processor 605 via an interconnect according to a PCIe® protocol, e.g., in accordance with the PCI Express® Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 605 via, e.g., a USB link or a universal asynchronous receiver transmitter (UART) link.

Figure 7:
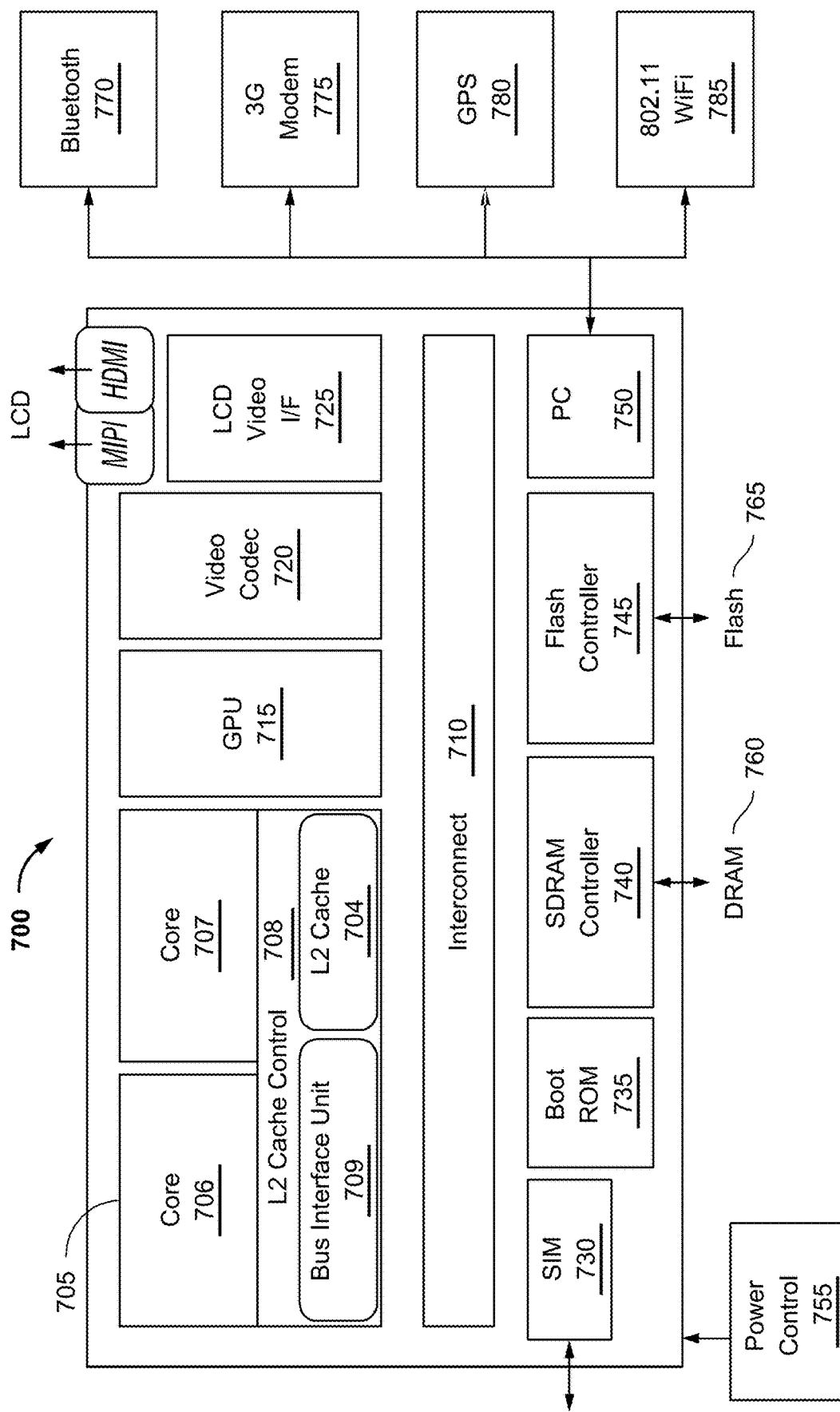
FIG. 7 illustrates a system on a chip (SOC) design, according to one embodiment.

Turning next to FIG. 7, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 704 to communicate with other parts of system 700. Interconnect 710 includes an on-chip interconnect, such as an IOSF, AMBA, or other interconnect discussed above, which potentially implements one or more aspects of the described disclosure. In one embodiment, interconnect 710 includes a multicast bus 130 that includes one or more flow router circuits 140 (see FIG. 1).

Interface 710 provides communication channels to the other components, such as a Subscriber Identity Module (SIM) 730 to interface with a SIM card, a boot rom 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

Interconnect 710 may connect with another component via a data bus 152 (e.g., on-chip interconnect, IOSF, AMBA, or other interconnect). The flow router circuits 140 may be used to reduce toggle power consumed.

In addition, the system illustrates peripherals for communication, such as a Bluetooth® module 770, 3G modem 775, GPS 785, and Wi-Fi® 785. Note as stated above, a UE includes a radio for communication. As a result, these peripheral communication modules are not all required. However, in a UE some form a radio for external communication is to be included.

Referring now to FIG. 8, shown is a block diagram of a system 800 in accordance with an embodiment of the disclosure. As shown in FIG. 8, multiprocessor system 800 is a point-to-point interconnect system, and includes a first processor 870 and a second processor 880 coupled via a point-to-point interconnect 850. Each of processors 870 and 880 may be some version of a processor. In one embodiment, 852 and 854 are part of a serial, point-to-point coherent interconnect fabric, such as Intel® Quick Path Interconnect (QPI) architecture. As a result, the disclosure may be implemented within the QPI architecture.

While shown with only two processors 870, 880, it is to be understood that the scope of the present disclosure is not so limited. In other embodiments, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 each exchange information with a chipset 890 via individual P-P interfaces 852, 854 using point to point interface circuits 876, 894, 886, 898. Chipset 890 also exchanges information with a high-performance graphics circuit 838 via an interface circuit 892 along a high-performance graphics interconnect 839. In one embodiment, chipset 890 includes flow router circuits 140.

Chipset 890 may connect with another component via a data bus 152 (e.g., P-P interface 852, P-P interface 854, high-performance graphics interconnect 839, bus 816, and so forth). The flow router circuits 140 may be used to reduce toggle power consumed.

A shared cache (not shown) may be included in either processor or outside of both processors; yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 are coupled to first bus 816, along with a bus bridge 818 which couples first bus 816 to a second bus 820. In one embodiment, second bus 820 includes a low pin count (LPC) bus. Various devices are coupled to second bus 820 including, for example, a keyboard and/or mouse 822, communication devices 827 and a storage unit 828 such as a disk drive or other mass storage device which often includes instructions/code and data 830, in one embodiment. Further, an audio I/O 824 is shown coupled to second bus 820. Note that other architectures are possible, where the included components and interconnect architectures vary. For example, instead of the point-to-point architecture of FIG. 8, a system may implement a multi-drop bus or other such architecture.

The following examples pertain to further embodiments.

Example 1 is an integrated circuit comprising: a transmitter circuit; a plurality of receiver circuits; and a multicast bus coupled between the transmitter circuit and the plurality of receiver circuits, wherein the multicast bus comprises a first flow router circuit to route a multicast signal to a first receiver circuit of the plurality of receiver circuits and not route the multicast signal to a second receiver circuit of the plurality of receiver circuits.

In Example 2, the subject matter of Example 1, wherein the transmitter circuit resides in a memory device.

In Example 3, the subject matter of any one of Examples 1-2, wherein the first flow router circuit is disposed at a first split point on the multicast bus, wherein the first flow router circuit comprises an input port coupled to a first segment, a first output port coupled to a second segment, and second output port coupled to a third segment of the multicast bus, wherein the first segment is coupled to the transmitter circuit, wherein the second segment is coupled to the first receiver circuit, and wherein the third segment is coupled to the second receiver circuit.

In Example 4, the subject matter of any one of Examples 1-3, wherein the first flow router circuit comprises a third output port coupled to a fourth segment of the multicast bus, wherein the fourth segment is coupled to a third receiver circuit of the plurality of receiver circuits.

In Example 5, the subject matter of any one of Examples 1-4, wherein the multicast bus further comprises a second flow router circuit disposed at a second split point on the multicast bus, wherein the second flow router circuit comprises an input port coupled to an inlet portion of the second segment, a first output port coupled to an outlet portion of the second segment, and a second output port coupled to a fifth segment coupled to a fourth receiver circuit of the plurality of receiver circuits.

In Example 6, the subject matter of any one of Examples 1-5, wherein the first split point is a first junction, and wherein the multicast bus comprises a second split point on the second segment, wherein the second split point is a second junction coupled to an inlet portion of the second segment, an outlet portion of the second segment and a fifth segment coupled to a fourth receiver circuit of the plurality of receiver circuits.

In Example 7, the subject matter of any one of Examples 1-6, wherein the multicast bus further comprises a third flow router circuit disposed at a third split point on the multicast bus, wherein the third flow router circuit comprises an input port coupled to an inlet portion of the third segment, a first output port coupled to an outlet portion of the third segment, and a second output port coupled to a sixth segment coupled to a fifth receiver circuit of the plurality of receiver circuits.

In Example 8, the subject matter of any one of Examples 1-7, wherein the first split point is a first junction, and wherein the multicast bus comprises a third split point on the third segment, wherein the third split point is a third junction coupled to an inlet portion of the third segment, an outlet portion of the third segment and a sixth segment coupled to a fifth receiver circuit of the plurality of receiver circuits.

In Example 9, the subject matter of any one of Examples 1-8, wherein the first flow router circuit comprises: a input port; a first output port; a second output port; a pull-down circuit; and a conditional transmitter to receive the multicast signal on the input port, decode the multicast signal to determine whether to transmit the multicast signal on the first output port, the second output port, or both or to ground the first output port, the second output port, or both using the pull-down circuit.

In Example 10, the subject matter of any one of Examples 1-9, wherein the first flow router circuit further comprises a clock control circuit coupled to the conditional transmitter, the clock control circuit to control timing of transmission of the multicast signal, if at all, on the first output port, the second output port, or both.

Example 11 is a method comprising: identifying, by a layout and routing tool executing on a processing device, a multicast bus in a first circuit design defined in a hardware descriptor language file; identifying, by the layout and routing tool, a source transmitter circuit and a plurality of receiver circuits coupled to the multicast bus; determining, by the layout and routing tool, power metrics of segments of the multicast bus; determining, by the layout and routing tool, an amount of power savings in placement of a first flow router circuit on a first split point on the multicast bus; modifying, by the layout and routing tool, the first circuit design to obtain a second circuit design comprising the first flow router circuit on the first split point when the amount of power savings is greater than an amount of power to be consumed by the first flow router circuit; and generating, by the layout and routing tool, a gate-level description file based on the second circuit design.

In Example 12, the subject matter of Example 11 further comprising: determining, by the layout and routing tool for each of a plurality of split points of the multicast bus, a corresponding amount of power savings in placement of a corresponding flow router circuit on a corresponding split point of the plurality of split points; modifying, by the layout and routing tool, the first circuit design to obtain a plurality of flow router circuits, each of the plurality of flow router circuits being on the corresponding split point when the corresponding amount of power savings is greater than a corresponding amount of power to be consumed by the corresponding flow router circuit.

In Example 13, the subject matter of any one of Examples 11-12, wherein the determining the power metrics comprises determining toggle power consumed by the segments based on corresponding bus route length and corresponding bus width.

In Example 14, the subject matter of any one of Examples 11-13, wherein the determining the toggle power is further based on corresponding process specific resistor-capacitor (RC) values, and corresponding activity factor.

In Example 15, the subject matter of any one of Examples 11-14, wherein the first flow router circuit comprises an input port coupled to a first segment, a first output port coupled to a second segment, and second output port coupled to a third segment of the multicast bus, wherein the first segment is coupled to the source transmitter circuit, wherein the second segment is coupled to a first receiver circuit of the plurality of receiver circuits, and wherein the third segment is coupled to a second receiver circuit of the plurality of receiver circuits.

In Example 16, the subject matter of any one of Examples 11-15 further comprising analyzing a plurality of multicast buses that are not defined by front end description for automatic insertion of flow router circuits, the plurality of multicast buses comprising the multicast bus, wherein the identifying of the multicast bus is based on the analyzing of the plurality of multicast buses and the corresponding amount of power savings of the multicast bus.

Example 17 is a non-transitory storage medium storing instructions that when executed by a processing device cause the processing device to: identify, by a layout and routing tool executing on the processing device, a multicast bus in a first circuit design defined in a hardware descriptor language file; identify, by the layout and routing tool, a source transmitter circuit and a plurality of receiver circuits coupled to the multicast bus; determine, by the layout and routing tool, power metrics of segments of the multicast bus; determine, by the layout and routing tool, an amount of power savings in placement of a first flow router circuit on a first split point on the multicast bus; modify, by the layout and routing tool, the first circuit design to obtain a second circuit design comprising the first flow router circuit on the first split point when the amount of power savings is greater than an amount of power to be consumed by the first flow router circuit; and generate, by the layout and routing tool, a gate-level description file based on the second circuit design.

In Example 18, the subject matter of Example 17, wherein determining the power metrics comprises determining toggle power consumed by the segments based on corresponding bus route length, corresponding bus width, corresponding process specific resistor-capacitor (RC) values, and corresponding activity factor.

In Example 19, the subject matter of any one of Examples 17-18, wherein the first flow router circuit comprises an input port coupled to a first segment, a first output port coupled to a second segment, and second output port coupled to a third segment of the multicast bus, wherein the first segment is coupled to the source transmitter circuit, wherein the second segment is coupled to a first receiver circuit of the plurality of receiver circuits, and wherein the third segment is coupled to a second receiver circuit of the plurality of receiver circuits.

In Example 20, the subject matter of any one of Examples 17-19, wherein a second flow router circuit disposed at a second split point on the multicast bus, wherein the second flow router circuit comprises an input port coupled to an inlet portion of the second segment, a first output port coupled to an outlet portion of the second segment, and a second output port coupled to a fifth segment coupled to a fourth receiver circuit of the plurality of receiver circuits.

Example 21 is an apparatus comprising means to perform a method of any one of Examples 11-16.

Example 22 is at least one machine readable medium comprising a plurality of instructions, when executed, to implement a method or realize an apparatus of any one of Examples 11-16.

Example 23 is an apparatus comprising means for performing the method of any one of Examples 11-16.

Example 24 is an apparatus comprising a processor configured to perform the method of any one of Examples 11-16.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "routing," "identifying," "determining," "modifying," "generating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. An integrated circuit comprising:
   a transmitter circuit;
   a plurality of receiver circuits; and
   a multicast bus coupled between the transmitter circuit and the plurality of receiver circuits, wherein the multicast bus comprises a first flow router circuit to route a multicast signal to a first receiver circuit of the plurality of receiver circuits and not route the multicast signal to a second receiver circuit of the plurality of receiver circuits,
   wherein the first flow router circuit is disposed at a first split point on the multicast bus, wherein the first flow router circuit comprises an input port coupled to a first segment, a first output port coupled to a second segment, and second output port coupled to a third segment of the multicast bus, wherein the first segment is coupled to the transmitter circuit, wherein the second segment is coupled to the first receiver circuit, and wherein the third segment is coupled to the second receiver circuit.

2. The integrated circuit of claim 1, wherein the transmitter circuit resides in a memory device.

3. The integrated circuit of claim 1, wherein the first flow router circuit comprises a third output port coupled to a fourth segment of the multicast bus, wherein the fourth segment is coupled to a third receiver circuit of the plurality of receiver circuits.

4. The integrated circuit of claim 1, wherein the multicast bus further comprises a second flow router circuit disposed at a second split point on the multicast bus, wherein the second flow router circuit comprises an input port coupled to an inlet portion of the second segment, a first output port coupled to an outlet portion of the second segment, and a second output port coupled to a fifth segment coupled to a fourth receiver circuit of the plurality of receiver circuits.

5. The integrated circuit of claim 4, wherein the multicast bus further comprises a third flow router circuit disposed at a third split point on the multicast bus, wherein the third flow router circuit comprises an input port coupled to an inlet portion of the third segment, a first output port coupled to an outlet portion of the third segment, and a second output port coupled to a sixth segment coupled to a fifth receiver circuit of the plurality of receiver circuits.

6. The integrated circuit of claim 4, wherein the first split point is a first junction, and wherein the multicast bus comprises a third split point on the third segment, wherein the third split point is a third junction coupled to an inlet portion of the third segment, an outlet portion of the third segment and a sixth segment coupled to a fifth receiver circuit of the plurality of receiver circuits.

7. The integrated circuit of claim 1, wherein the first split point is a first junction, and wherein the multicast bus comprises a second split point on the second segment, wherein the second split point is a second junction coupled to an inlet portion of the second segment, an outlet portion of the second segment and a fifth segment coupled to a fourth receiver circuit of the plurality of receiver circuits.

8. The integrated circuit of claim 1, wherein the first flow router circuit comprises:
   a input port;
   a first output port;
   a second output port;
   a pull-down circuit; and
   a conditional transmitter to receive the multicast signal on the input port, decode the multicast signal to determine whether to transmit the multicast signal on the first output port, the second output port, or both or to ground the first output port, the second output port, or both using the pull-down circuit.

9. The integrated circuit of claim 8, wherein the first flow router circuit further comprises a clock control circuit coupled to the conditional transmitter, the clock control circuit to control timing of transmission of the multicast signal, if at all, on the first output port, the second output port, or both.

* * * * *